(12) United States Patent
Tuttle (10) Patent No.: US 8,330,289 B2
(45) Date of Patent: Dec. 11, 2012

(54) METHOD AND SYSTEM OF EXTRACTING ENERGY FROM WIND

(75) Inventor: John R. Tuttle, Longmont, CO (US)

(73) Assignee: Windpipe Corporation, Longmont, CO (US)

( * ) Notice: Subject to any disclaimer, the term of this patent is extended or adjusted under 35 U.S.C. 154(b) by 0 days.

(21) Appl. No.: 13/384,555

(22) PCT Filed: May 26, 2010

(86) PCT No.: PCT/US2010/036119
§ 371 (c)(1),
(2), (4) Date: Jan. 17, 2012

(87) PCT Pub. No.: WO2011/011109
PCT Pub. Date: Jan. 27, 2011

(65) Prior Publication Data
US 2012/0119507 A1 May 17, 2012

Related U.S. Application Data

(60) Provisional application No. 61/226,950, filed on Jul. 20, 2009.

(51) Int. Cl.
*F03D 9/00* (2006.01)
*H02P 9/04* (2006.01)
(52) U.S. Cl. ............................................ 290/55; 290/44
(58) Field of Classification Search .................. 290/55, 290/54, 44, 43; 415/4.5
See application file for complete search history.

(56) References Cited

U.S. PATENT DOCUMENTS

| 2,895,063 | A | 7/1959 | Morris |
| 3,239,678 | A | 3/1966 | Kolm et al. |
| 3,772,541 | A | 11/1973 | Campagnuolo et al. |
| 4,045,144 | A | 8/1977 | Loth |
| 4,387,318 | A | 6/1983 | Kolm et al. |
| 4,455,877 | A | 6/1984 | Blechinger et al. |
| 4,467,236 | A | 8/1984 | Kolm et al. |

(Continued)

FOREIGN PATENT DOCUMENTS

EP 1180597 A1 2/2002

(Continued)

OTHER PUBLICATIONS

Kriesels, P.C. et al. "High Amplitude Vortex-Induced Pulsations in a Gas Transport System," Journal of Sound and Vibration, 184(2), pp. 343-368. 1995.

(Continued)

*Primary Examiner* — Hae Moon Hyeon
(74) *Attorney, Agent, or Firm* — Mark E. Scott; Conley Rose, P.C.

(57) ABSTRACT

Extracting energy from wind. At least some of the illustrative embodiments are methods including: directing a fluid flow across an aperture of an elongated cavity, the directing the fluid flow across the aperture at a non-right angle to a central axis defined by an entrance portion of the elongated cavity, and the elongated cavity has a resonant frequency; creating pressure waves within the elongated cavity, the pressure waves created at least in part by vortices within the fluid flow across the aperture; exciting a resonant structure by way of the pressure waves within the elongated cavity, the resonant structure coupled to the elongated cavity and the resonant structure configured to resonant at substantially the resonant frequency; and extracting energy from oscillatory motion of the resonant structure.

50 Claims, 7 Drawing Sheets

U.S. PATENT DOCUMENTS

| | | |
|---|---|---|
| 4,516,907 A | 5/1985 | Edwards |
| 4,536,674 A | 8/1985 | Schmidt |
| 3,539,840 A | 6/1986 | Campagnuolo |
| 5,223,763 A | 6/1993 | Chang |
| 6,011,346 A | 1/2000 | Buchanan et al. |
| 6,424,079 B1 | 7/2002 | Carroll |
| 7,199,480 B2 | 4/2007 | Fripp et al. |
| 7,208,845 B2 | 4/2007 | Masters et al. |
| 7,224,077 B2 | 5/2007 | Allen |
| 7,560,856 B2 | 7/2009 | Chen et al. |
| 7,573,143 B2 | 8/2009 | Frayne |
| 7,821,153 B2 * | 10/2010 | Gray .............................. 290/55 |
| 2009/0121489 A1 | 5/2009 | Kawai |
| 2010/0207388 A1 * | 8/2010 | Nyffenegger ................... 290/43 |

FOREIGN PATENT DOCUMENTS

| | | |
|---|---|---|
| JP | 2006-226221 A | 8/2006 |
| WO | 02/44559 A2 | 6/2002 |

OTHER PUBLICATIONS

International Search Report and Written Opinion issued on Dec. 24, 2010 in PCT Patent Application No. PCT/US10/036119.

* cited by examiner

METHOD AND SYSTEM OF EXTRACTING ENERGY FROM WIND

CROSS-REFERENCE TO RELATED APPLICATIONS

This application claims the benefit of U.S. Provisional Patent App. No. 61/226,950 filed Jul. 20, 2009, titled "Improved methods and systems for generating electrical energy from wind energy", and which provisional application is incorporated by reference herein as if reproduced in full below. Moreover, this application is a US national phase entry of PCT Application No. PCT/US 2010/36119 filed May 26, 2010, and which PCT application is incorporated by reference herein as if reproduced in full below.

BACKGROUND

Renewable energy sources are a topic of much importance in view of the geopolitical landscape, as we well as perceived climate change. One of the more popular renewable energy sources is wind energy. Wind energy has been used a source mechanical power for hundreds of years, and in more modern times has been used as a source of electrical energy. In the case of creating electrical energy, the air flow of wind is used to turn a propeller (i.e., wind passing blades of large wind generators cause rotation), and the rotational mechanical energy is then converted to electrical energy.

In spite of the many technological advances, propeller-driven wind generation still has many drawbacks. For example, most large scale propeller-driven wind generation use a governor in winds over about 22 miles per hour (MPH), and thus the additional energy in wind in excess of 22 MPH is lost. Moreover, large propeller-driven wind generation has adverse environmental consequences. In particular, the turning blades produce audible noise that disrupts both animals and people living in proximity. Moreover, the large blades are a hazard to birds and other animals such as bats.

Beyond the environmental issues, large propeller-driven wind generation is also expensive to construct and maintain, given that the mechanical components and electrical circuitry are perched atop a tower that may be on the order of 100 to 250 feet above the ground.

Thus, what is needed is a system to extract useful work from the wind that does not need to rely on large propeller-driven equipment.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, renewable resource companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Axis" shall mean an imaginary line that lies along the geometric center of an elongated cavity or volume, but axis shall not require that the elongated volume be symmetrical about the axis. Thus, for example, an imaginary line running along the center of a rectangular passageway shall be considered an axis, even though rotational symmetry along the center line does not exist.

"Direction of fluid flow" or "direction of air flow" shall mean the direction of the air or fluid flow measured just before the air or fluid flow encounters a leading edge of an aperture.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to extracting useful energy from wind, where the extraction does not rely on the wind turning propellers. More particularly, the various embodiments are directed to systems where a fluid flow causes pressure waves (e.g., acoustic waves) in the fluid within an elongated cavity. The pressures waves create vibratory or oscillatory motion, and useful work is extracted from the oscillatory motion. The various embodiments were developed in the context of the elongated cavity defined by pipe or tube, and air flow across the tube creating acoustic waves in the air within the tube. The description below is thus based on the developmental context; however, the developmental context shall not be read as a limitation as to the scope of the various embodiments.

Figure 1:
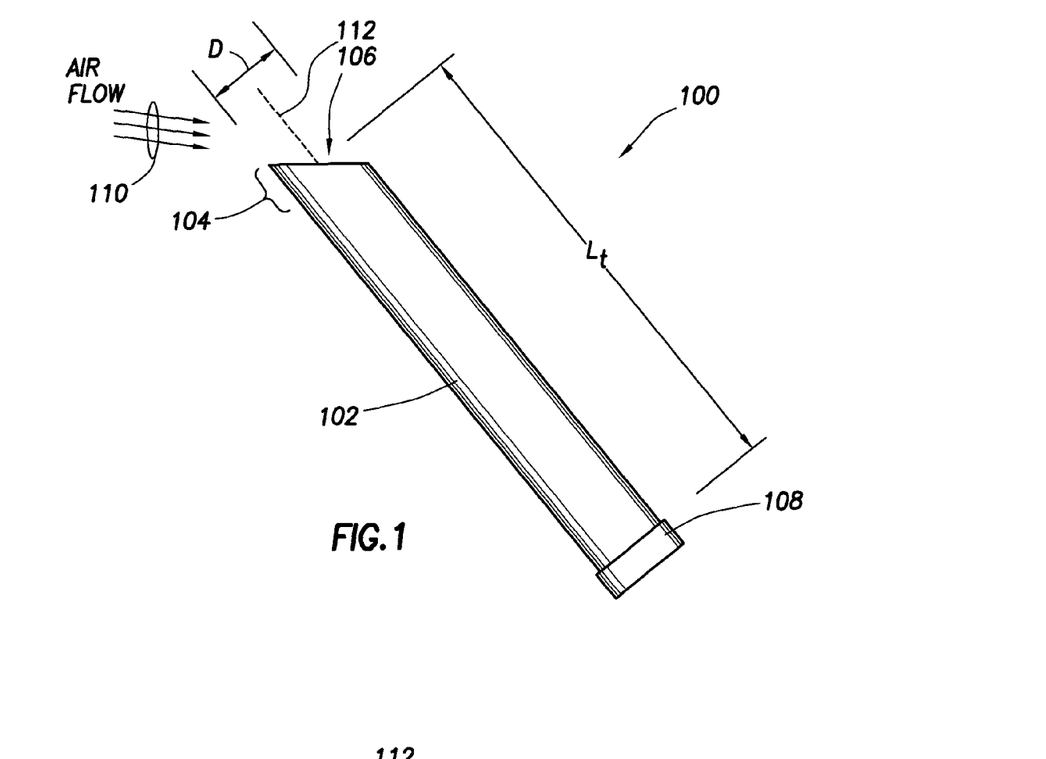
FIG. 1 shows a vortex tube in accordance with at least some embodiments.

FIG. 1 shows a side elevation view of a vortex tube 100 in accordance with at least some embodiments. In particular, the vortex tube 100 illustrated comprises a cylindrical outer body or tube 102 that defines an elongated cavity (the elongated cavity not visible in FIG. 1). The vortex tube 100 further comprises an entrance portion 104 having an aperture 106, where the aperture 106 leads to the elongated cavity. Further, the vortex tube 100 comprises a resonant structure 108, illustrative examples of which are discussed more thoroughly below. The vortex tube 100 defines a length (labeled $L_t$ in the drawings) and an internal diameter (labeled D in the drawings).

Confined volumes, such as the elongated cavity within the vortex tube 100, in most cases have a one or more resonant frequencies of pressure waves or acoustic waves. For example, a confined volume in the form of a cylindrical tube with a closed end, such as illustrated in FIG. 1, has approximate resonant frequencies as given by the equation:

$$f_c = \frac{nv}{4(L_t + 0.4D)} \quad (1)$$

where $f_c$ is the resonant frequency of the closed end tube, v is the velocity of sound of the fluid in the tube (e.g., air has a velocity of sound of approximately 343 meters/second at sea level pressure and at 20° Celsius), n is an odd integer (i.e., 1, 3, 5, . . . ), $L_t$ is the length of the tube, and D is the internal diameter. So, for example, an illustrative commercial scale vortex tube 100 filled with air, having a closed end, a diameter of 3 meters and a length of 27 meters, will have a first (n=1) resonant frequency of about 3 cycles per second (Hertz).

Still referring to FIG. 1, in accordance with the various embodiments, the one or more resonant frequencies of the vortex tube 100 are created by air flow across the entrance portion 104, as illustrated by air flow 110. As will be discussed in greater detail below, the air flow 110 across the aperture 106 formed by the entrance portion 104 results in the creation of vortices that, in turn, create the acoustic waves within the vortex tube 100 at one or more of the resonant frequencies. The inventor of the present specification has found an unexpected result that air flow 110 across aperture 106 of the elongated cavity in a particular range of physical circumstances surprisingly results in creation of acoustic waves with sufficient energy to be useful in extracting energy from the air flow. As shown in FIG. 1, the aperture 106 is arranged and constructed such that the air flow 110 crosses the aperture at a non-right angle to the central axis 112 of the entrance portion 104 of the vortex tube 100. The acoustic waves created by the air flow 110 excite the resonant structure 108 such that oscillatory motion of the resonant structure occurs, and useful work (e.g., mechanical motion, generation of electrical energy), is extracted from the oscillatory motion.

Figure 2:
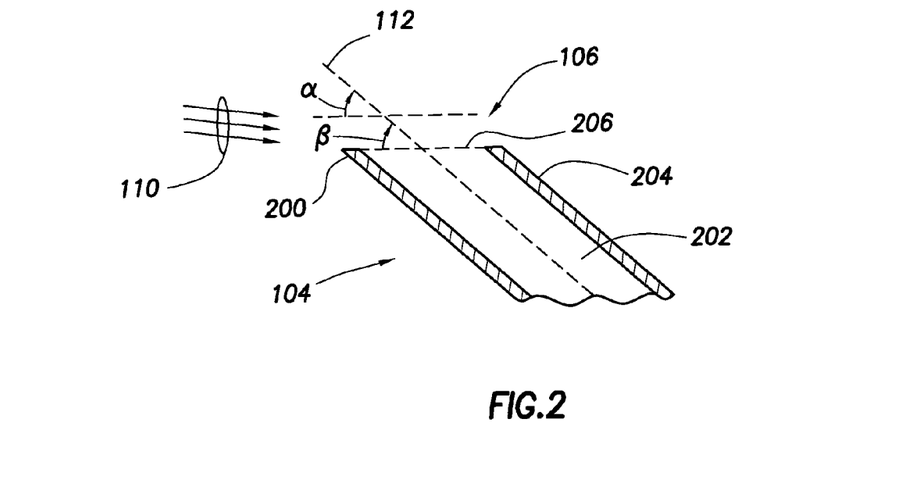
FIG. 2 shows a cross-sectional elevation view of the entrance portion of the vortex tube in accordance with at least some embodiments.

FIG. 2 shows a cross-sectional elevation view of the entrance portion 104 of the vortex tube 100 in accordance with at least some embodiments, and in order to show illustrative physical relationships. In particular, FIG. 2 illustrates the central axis 112 of the entrance portion 104 (which also happens to be the central axis of the elongated cavity 202 in these embodiments). The air flow 110 directed toward the aperture 106 encounters the elongated cavity 202 after crossing the windward wall 200, and then the air flow encounters the leeward wall 204. In accordance with the various embodiments, the direction of air flow across the aperture is such that the acute angle α between direction of air flow 110 and the central axis 112 is between 10 and 50 degrees inclusive. In a particular embodiment, the acute angle α between direction of air flow 110 and the central axis 112 is between 28 and 33 degrees.

Likewise, the orientation of the aperture 106 to the central axis 112 is a non-right angle. In particular, consider a line segment 206 (shown in dashed form) defined by two points on opposite sides of the aperture 106, and the line segment 206 at least somewhat aligned with the direction of air flow 110 (in some cases parallel, but not required). In accordance with at least some embodiments, the line segment 206 defined across the aperture 106 intersects the central axis 112 at non-right angle. More particularly still, the acute angle β between the line segment 206 and the central axis 112 is between 10 and 50 degrees, inclusive. In a particular embodiment, the acute angle β between the line segment 206 and the central axis is between 28 and 33 degrees, inclusive. It is noted that while the acute angle between a between the direction of air flow 110 and the central axis 112 and the acute angle β between the line segment 206 and the central axis 112 are disclosed to be within the same range of values, it does not necessarily follow that the respective angles are the same in practice. In fact, in a particular embodiment the acute angle α may be smaller than the acute angle β.

Figure 3:
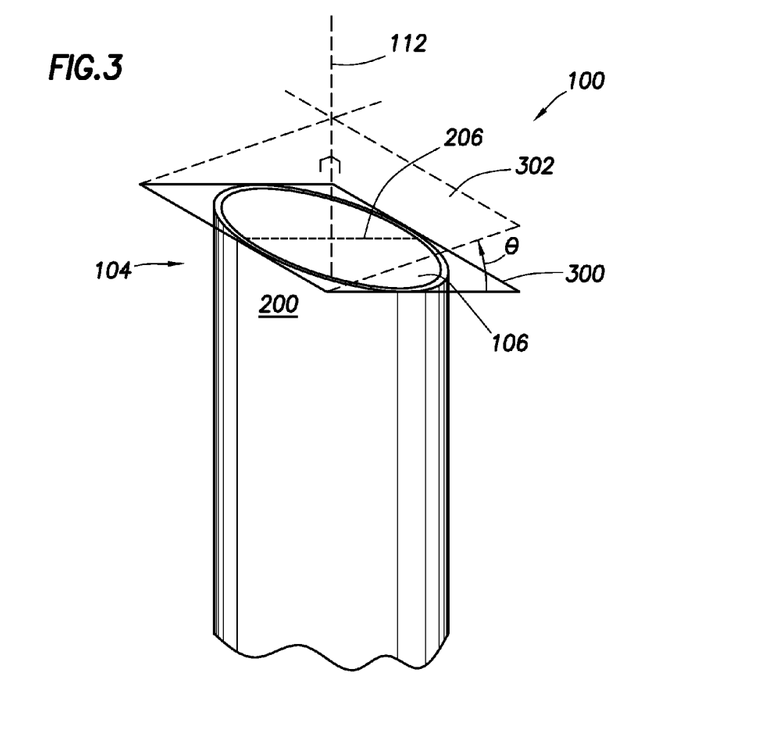
FIG. 3 shows a perspective view of the entrance portion of the vortex tube in accordance with at least some embodiments.

FIG. 3 shows a perspective view of the entrance portion 104 of the vortex tube 100 in order to present an alternate approach to defining the relationship between the aperture 106 and the central axis 112 of the entrance portion 104. In particular, the aperture 106 in these embodiments defines an ellipse that resides within and/or defines a plane 300. Moreover, FIG. 3 illustrates another plane 302 (shown in dashed lines) arranged such that the central axis 112 of the entrance portion 104 is normal to the plane 302. In accordance with at least some embodiments the acute angle θ between the plane 302 and the plane 300 defined by the aperture 106 is between 10 and 50 degrees, inclusive. In a particular embodiment, the acute angle θ between the line segment plane 302 and the plane 300 is between 28 and 33 degrees, inclusive. FIG. 3 also illustrative shows the line segment 206 discussed with respect to FIG. 2.

Air flow 110 that encounters the aperture 106 behind the windward wall 200 creates vortices, or swirls of air, within the entrance portion 106 of the vortex tube 100. Although the vortices may be created in any orientation, computer simulations performed indicate that each vortex swirls around an axis that is in many cases perpendicular to the air flow 110. Moreover, the direction of the swirl of each vortex tends to carry the vortex across the aperture 106 in the direction of the air flow. There are many physical mechanisms that may contribute to the creation of vortices at the aperture 106. For example, "vortex shedding" is a phenomenon where vortices are created as air flow moves over a surface, but the then the surface falls away relative to the direction of the air flow (i.e., a bluff). In cases where the bluff is not associated with a resonant cavity, the frequency of vortex shedding is directly related to the air flow velocity (i.e., the faster the air flow moves, the higher the vortex shedding frequency). By contrast, shear layer instabilities are associated with the interaction of two air flow streams flowing at different speeds, and the interaction creates vortices at the interface of the two streams. Vortex shedding and shear layer instabilities may be related in that air flow over a bluff in effect becomes a shear layer consideration at locations where the downstream surface falls away from the air flow. For purposes of this specification, and regardless of the precise physical mechanism at play, the term "vortex shedding" shall refer any mechanism which creates vortices at the aperture 106 of a vortex tube 100.

Vortex shedding within the aperture 106 of vortex tube 100 may be characterized by a dimensionless number known as the Strouhal number, and the Strouhal number may be given approximately by the following equation:

$$St = \frac{f_v L_a}{V} \quad (2)$$

where St is the Strouhal number, $f_v$ is the frequency of vortex shedding, $L_a$ is the length across the aperture measured in the direction of the air flow, and V is the velocity of air flow. For example, for the illustrative vortex tube 100 having angle θ (FIG. 3) of 28 degrees, a diameter of 3 meters (implying a $L_a$ of 3.39 meters), a vortex shedding frequency of 3 Hertz, and an air flow velocity of about 10 meters/second (m/s) (about 22 MPH), the Strouhal number according to equation (2) is approximately 1.0.

Vortex tubes in accordance with the various embodiments are designed and constructed such that the vortex shedding frequency at the aperture and selected resonant frequency of the elongated cavity defined by the tube are related. Stated otherwise, and as alluded to above, the system is designed such that the vortex shedding frequency results in pressure waves within the elongated cavity at the selected resonant frequency of the elongated cavity. The relationship between vortex shedding frequency and the resonant frequency of the elongated cavity leads to a surprising result termed herein "frequency locking."

With respect to frequency locking, reflecting again on equation (2) above it is noted that the Strouhal number is inversely proportional to air flow velocity V. Thus, for a system designed to hold the Strouhal number fairly constant, a change in air flow velocity V would be expected to result in a change in the vortex shedding frequency $f_v$. However, the inventor of the current specification has found that the combination of the aperture 106 and the resonant frequency of the elongated cavity work together to ensure a substantially constant vortex shedding frequency (being substantially the same as the selected resonant frequency of the elongated cavity) in spite of changes of velocity of the air flow across the cavity that would otherwise cause a change in vortex shedding frequency. In particular, the inventor of the current specification has found that for vortex tubes as described substantially the same vortex shedding frequency can be expected at the aperture 106 in spite of changes in air flow velocity that would otherwise dictate a change in vortex shedding frequency (and stated equivalently, in spite of changes in the Strouhal number).

Consider again the vortex tube having a 3 meter diameter and 27 meter length. As discussed above, such a vortex tube has a n=1 resonant frequency of about 3 Hertz. Moreover, assuming an angle θ (FIG. 3) being 28 degrees, an air flow angle α of about 28 degrees, and an air flow velocity of about 10 meters/second (m/s) (about 22 MPH), the Strouhal number according to equation (2) is approximately 1.0. Now consider the same system, but with an air flow velocity of 20 m/s (about 45 MPH). In the doubled air flow velocity situation, the initial reaction is to believe the vortex shedding frequency to have increased; however, in spite of the doubling air flow velocity, scale model tests indicate that the vortex shedding frequency will remain substantially constant at about 3 Hertz, meaning that the Strouhal number according to equation (2) become approximately 0.5. Stated otherwise, the vortex shedding frequency remains substantially constant over the range of Strouhal numbers from about 0.5 to 1.0. Thus, the inventor of the present specification has found the surprising result that an aperture within which vortex shedding takes places in operational relationship with a resonant cavity results in a substantially constant vortex shedding frequency at a particular resonant frequency of the cavity (i.e., the frequency locking), and in at least some cases a substantially constant vortex shedding frequency for Strouhal numbers from about 0.5 to 1.0. Although the inventor does not wish to be tied to any particular physical explanation for the frequency locking, it is believed as of the writing of this specification that the pressure waves at the resonant frequency of the elongated cavity interact with the air flow at the aperture to force vortex creation at a frequency at or near the active resonant frequency of the elongated cavity. It is noted that the frequency locking may take many cycles to fully development. In particular cases, on the order of 100 cycles or more may be needed to "lock" the vortex shedding frequency to the elongated cavity resonant frequency.

The surprising discovery of frequency locking leads to a realization that a vortex tube 100 can be used over a wide range of air flow velocities, yet with the vortex tube still operating at the particular resonant frequency of the elongated cavity. In the particular embodiment of creation of electrical energy from air flow such as wind, each vortex tube may be designed to operate over a range of air flow velocities expected for the particular location, with emphasis on the average wind speed and above, since the distance across the aperture is limited by the diameter of the entrance portion of the elongated cavity. Thus, using the example commercial scale vortex tube above, having a 3 meter diameter and 27 meter length, the vortex shedding frequency should be locked to the resonant frequency of the elongated cavity over the wide range of air flow velocity from about 22 to 45 MPH (the higher wind speed ranges at which large propeller based wind generation self throttle). However, the range of wind speeds over which the vortex tube 100 operates without modification may be part of the design of the tube 102 and aperture 106, and thus 22 to 45 MPH is merely illustrative. The next consideration is how to handle lower air flow velocities.

Figure 4:
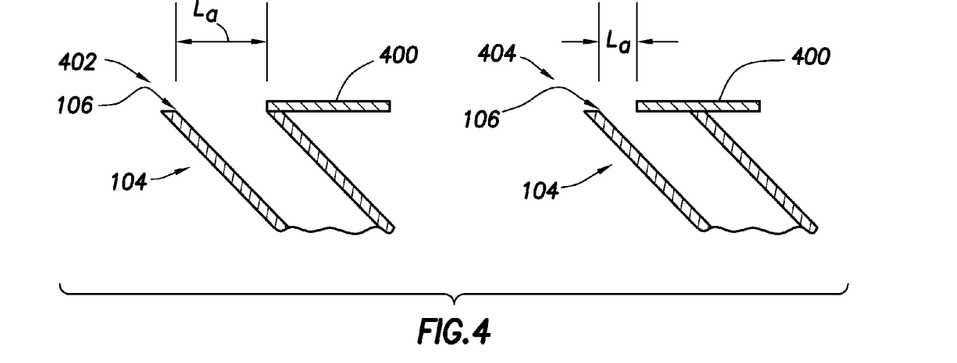
FIG. 4 shows cross-sectional elevation views of an entrance portion comprising a gate structure in accordance with at least some embodiments.

In most places on the globe, air flow velocity may be predictable in a statistical sense, but nevertheless at any time be well below average air flow velocity. A vortex tube whose length across the aperture is designed for air flow velocities on the high end of the expected range may not work well on days with lower air flow velocity. However, in accordance with at least some embodiments the vortex shedding issue at lower air flow velocities is addressed by a shutter or gate structure in operational relationship to the aperture 106. FIG. 4 shows a cross-sectional elevation view of an entrance portion 104 along with a gate structure 400 in accordance with at least some embodiments. In particular, the left portion 402 shows the illustrative gate portion 400 fully retracted from the aperture 106. The illustrative position of gate structure 400 in relation to the aperture 106 in portion 402 represents the largest $L_a$ (length across the aperture measured in the direction of air flow), and thus in some embodiments portion 402 represents an orientation or configuration used for high wind speeds.

Still referring to FIG. 4, as air flow velocity decreases, in order to keep the Strouhal number in a desired range (i.e., to keep the vortex shedding frequency sufficiently related to a desired resonant frequency of the elongated cavity), the gate structure 400 may change position, as shown in portion 404 of FIG. 4. In particular, the length $L_a$ of the aperture measured along the direction of the air flow (i.e., the exposed area of the aperture 106) is controlled by the position of the gate structure 400. In the case of changing from the relationship of portion 402 to the relationship of portion 404, the length $L_a$ of the aperture is shortened (i.e., the exposed area of the aperture 106 is reduced).

Consider again the commercial scale vortex tube having a 3 meter diameter, 27 meter length (i.e., a first resonant frequency of about 3 Hertz), an angle θ (FIG. 3) of 28 degrees, an air flow velocity of about 10 m/s (about 22 MPH), a vortex shedding frequency of about 3 Hertz, and with the gate structure 400 fully retracted. The illustrative situation implies a $L_a$ of 3.39 meters, and the Strouhal number according to equation (2) is approximately 1.0. Now consider that the air flow velocity drops to 1 m/s (about 2.2 MPH) for the same system, but with gate structure still fully retracted as shown in portion 402. The illustrative situation results in a Strouhal number, again according to equation (2), of approximately 10.0. In other words, it is unlikely that with the physical characteristics as stated and the gate structure 400 fully retracted that frequency locking as between the vortex shedding frequency at the aperture 106 and a desired resonant frequency of the elongated cavity of will occur, as the Strouhal number does not fall within or close to the range of about 0.5 to 1.0.

Now consider the same physical system and an air velocity of 1 m/s, but where the gate structure 400 has closed responsive to the drop in air flow velocity to shorten the length $L_a$ to be 0.25 meters. The illustrative situation results in a Strouhal number, again according to equation (2), of approximately 0.75. In other words, in the second illustrative situation frequency locking is still likely as the Strouhal number falls within the range of about 0.5 to 1.0. Thus, in situations where the air flow velocity drops, the vortex tube may still be used, with exposed area of the aperture reduced as air flow velocity decreases, and with exposed area of the aperture increased as air flow velocity increases. As mentioned above, however, frequency locking occurs over a range of Strouhal numbers, so adjusting the gate structure 400 need not take place with every change in air flow velocity; rather, adjusting the gate structure 400 may take place periodically, or only after air flow velocity changes by a threshold amount.

Moving the gate structure 400 may take many forms. In some embodiments the gate structure 400 may be moved by an electromechanical system that measures air flow velocity, and adjusts the gate structure 400 using a positioning system (e.g., linear actuator, motor and lead screw assembly). In yet still other embodiments, since the gate structure 400 positioning need only be controlled within a range or only in a rough sense, a mechanical system that adjusts the gate structure based purely on mechanically measured air flow velocity, and with the energy to move the gate structure 400 derived from the air flow.

Figure 5A:
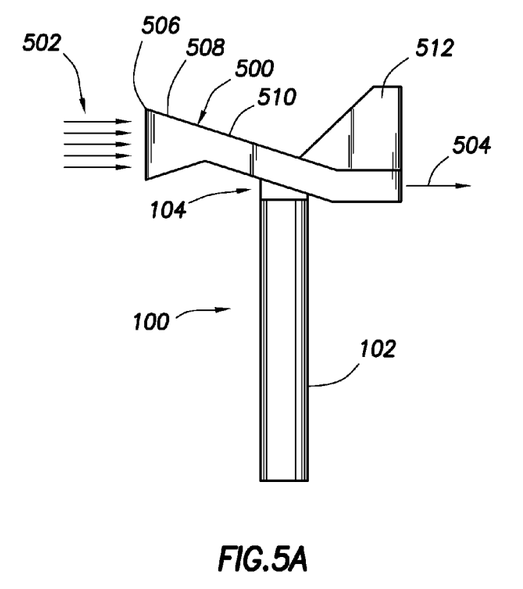
FIG. 5A shows an elevation view of a vortex tube with a duct system in accordance with at least some embodiments.

The various embodiments to this point have not discussed how the air flow 110 is directed to the entrance portion 104 of the vortex tube 100. In some embodiments, the vortex tube 100 is merely placed at a location where air flow is present such that the air flow 110 flows across the aperture 106 with no structure to direct the air flow to the entrance portion. In yet still other embodiments, the vortex tube 100 further comprises a duct system mechanically coupled to the entrance portion, as shown in FIG. 5A. In particular, FIG. 5A shows a side elevation view of a vortex tube 100 comprising a duct system 500 in operational relationship to the entrance portion 104. As shown, the duct system 500 collects air flow 502 and directs the air flow across the aperture (not visible in FIG. 5A) as discussed above. After encountering the aperture, at least a portion of the air flow exits the duct structure, as shown by arrow 504.

The duct system 500 comprises a collection aperture 506 that defines a first cross-sectional area. In at least some embodiments the collection aperture 506 is defined by a cone structure 508 that, on one end has the first cross-sectional area, and the cone section 508 on the other end has a reduced cross-sectional area that couples to a reduced area duct portion 510. The reduced area duct portion 510 defines a second cross-sectional area, smaller than the first cross-sectional area, and the reduced area duct portion 510 directs the air flow across the aperture. In some cases, the aperture 106 (not visible in FIG. 5) aligns with a wall of the duct portion, while in other cases the entrance portion 104 (not visible in FIG. 5) may extend slightly into the duct portion.

Figure 5B:
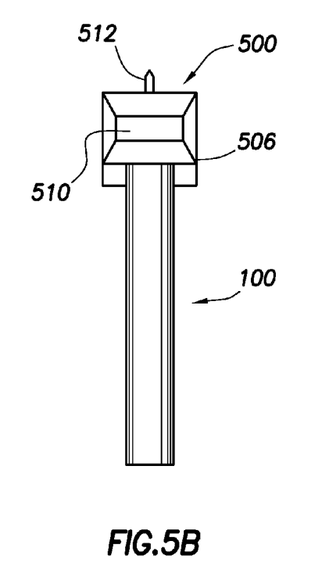
FIG. 5B shows an elevation view of a vortex tube with a duct system in accordance with at least some embodiments.

FIG. 5B shows a front elevation view of the vortex tube 100 comprising the duct structure 500. In particular, in the view of FIG. 5B collection aperture 506 is more clearly shown, along with the fact the collection aperture 506 is fluidly coupled to a reduced area duct portion 510 that defines a cross-sectional area smaller than that of collection aperture 506. Under Bernoulli's principle, as the air flow collected at the collection aperture 506 moves along the cone structure 508 (that is, as the cross-sectional area through which the air flow moves decreases) the velocity of the air flow tends to increase. Stated otherwise, the air flow velocity at the collection aperture 506 has a first value dependent upon the ambient air flow velocity. As a portion of the ambient air flow that enters the cone section 508 encounters a smaller cross-sectional area (i.e., reduced area duct portion 510), the air flow velocity increases proportional to the change in cross-sectional area. More particularly, the velocity of the fluid flow in the reduced area duct portion 510 will be given approximately by the equation:

$$V_2 = \frac{A_1 V_1}{A_2} \qquad (3)$$

where $V_2$ is the velocity of the fluid flow in the reduced area duct portion, $A_1$ is the cross-sectional area of the collection aperture, $V_1$ is the velocity at the collection aperture, and $A_2$ is the cross-sectional area of the reduced area duct portion.

In accordance with at least some embodiments, the air flow velocity at the aperture is designed to be within a desired range based on the change in cross-sectional area between the collection aperture 506 and the reduced area duct portion 510. For example, if air flow velocity at a particular location is lower than a desired air flow velocity across the aperture of the entrance portion 104, then the air flow velocity applied to the aperture of the entrance portion 104 may be increased by the use of duct system whose collection aperture 506 has a cross-sectional area larger than that of the reduced area duct portion 510.

In accordance with at least some embodiments, the duct system 500 and entrance portion 104 may also be designed and constructed to collect air flow from a plurality of different directions, depending upon the direction of the wind. Referring again to FIG. 5A, in accordance with at least some embodiments, the entrance portion 104 is rotationally coupled to the elongated cavity, and the duct system is rigidly coupled to the entrance portion 104. As the air flow direction changes, the collection aperture 506 of the duct system 500 is rotatable to collect air flow from the different direction. In some cases, the duct system 500 and entrance portion 104 may rotate through 360 degrees of rotation, but more limited rotation is also contemplated.

In some embodiments the duct system 500 and entrance portion 104 may be rotationally adjusted by an electromechanical system that measures air flow direction, and adjusts the duct system 500 and entrance portion 104 using a positioning system (e.g., stepper motor configured to cause rotational movement). In yet still other embodiments, a mechanical system adjusts the duct system 500 and entrance portion 104. Referring again to FIG. 5A, the duct system as illustrated comprises a rudder assembly 512. The rudder assembly 512 tends to orient aperture 506 in the direction of air flow. In particular, and referring to FIG. 5C, as the direction of air flow changes, the rudder assembly 512 presents larger surface area and thus a force is developed, which force tends to re-align the duct system 500. Thus, the duct system 500 may collect air flow from a plurality of different directions, as indicated by arrow 516, and in some cases the duct system 500 may rotate through 360 degrees.

Figure 5C:
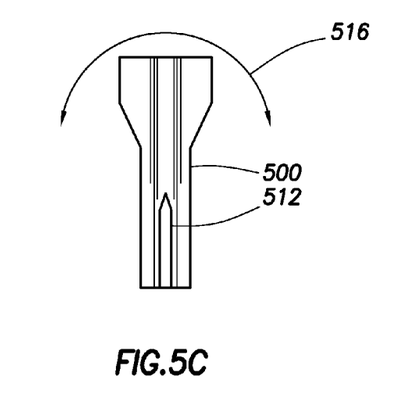
FIG. 5C shows an overhead view of a duct system in accordance with at least some embodiments.

A few points are in order before proceeding. First, as discussed above the orientation of the aperture 106 of the entrance portion 104 to the elongated cavity is preferably within a particular range of angles, thought the aperture is not visible in FIG. 5A, 5B or 5C. Likewise, the air flow angle α across the aperture 106 is preferably within a particular range of angles. Notice that, in FIG. 5A, the reduced area duct portion 510 slopes to enable the tube 102 to be vertical (i.e., normal to the ground), yet still have the relationships between air flow and the aperture. In other embodiments, the reduced area duct portion 510 is aligned with the entrance aperture 506 (i.e., has the same axis), and the tube 102 intersects the reduced area duct portion 510 at a non-right angle and the tube portion 102 in such embodiments would not be normal to the ground. Second, the illustrative embodiments of FIGS. 5A, 5B and 5C show a rectangular duct system 500; however, the cross-sectional shape of any portion of the duct system 500 may take any suitable form (e.g., round, square, hexagonal). Finally with respect to FIGS. 5A, 5B and 5C, it is noted that in particular embodiments the gate structure 400 of FIG. 4 may also be used in conjunction with duct system 500. That is, even though a duct system 500 may be used to augment the collection area over with air flow is collected and directed across the aperture, the air flow velocity may change sufficiently in any particular circumstance such that a gate structure 400 situated within the reduced area portion 510 (not visible in FIGS. 5A, 5B and 5C) may be adjusted to assure the Strouhal number stays within a desired range, thus ensuring frequency locking with respect to a resonant frequency of the elongated cavity.

However, in other embodiments the duct system 500 enables at least some control of air flow velocity across the aperture 106 in spite of changing ambient air flow velocity. In particular, in accordance with at least some embodiments, the duct system 500 is configured to change operational characteristics to ensure that air flow velocity across the aperture 106 stays within a predetermined range in spite of changing ambient air flow velocity. For example, on the upper end of air flow velocity, if the ambient air flow velocity is too high, the air flow velocity across the aperture 106 may be too high, and thus the effective collection area of the collection aperture 506 may changed. In a particular embodiment, the effective collection area may be changed by turning the duct system 500 to be slightly misaligned with the direction of air flow.

Figure 6:
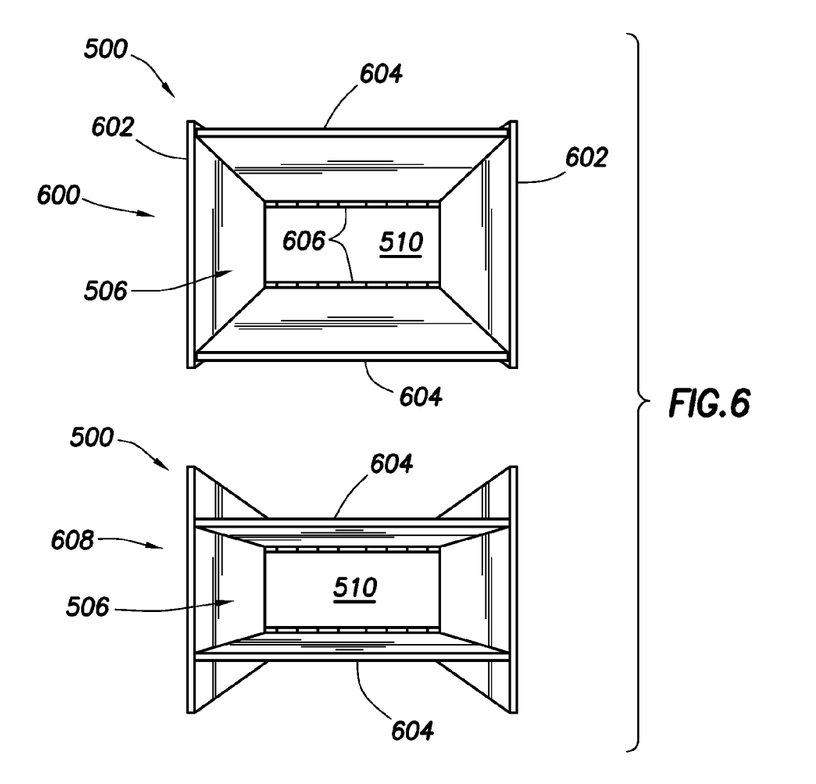
FIG. 6 shows front elevation views of portion of the duct system in accordance with at least some embodiments.

In yet still other embodiments, the change in effective collection area of the collection aperture 506 may be the result of a physical change in the effective size of the collection aperture. FIG. 6 shows two illustrative end elevation views of the duct system 500 in accordance with at least some embodiments. In particular, upper portion 600 shows the collection aperture defined by stationary panels 602 and moveable gate structures 604. The illustrative panels 602 and gate structures 604 define the collection aperture 506 on one end, and as well as the entrance portion for reduced area duct portion 510. Each gate structure 604 is hinged, such as by hinges 606, at the proximal end of the structure (i.e., hinged near the reduced area duct portion 510). As illustrated in upper portion 600, the gate structures 604 are oriented in such a manner that the collection aperture 506 is large (in the view of FIG. 6, air flow would be into the page). The orientation of the gate structures 604 of the upper portion 600 are illustrative of the situation where ambient air flow velocity may be low, and thus to ensure desired air flow velocity across the aperture 106 (not visible in FIG. 6), the gate structures 604 open to increase effective collection area.

Lower portion 608 of FIG. 6 shows the collection aperture 506 with the gate structures 604 oriented in such a manner to present a decreased collection area 506, thus reducing the amount of air flow collected (again, in the view of FIG. 6, air flow would be into the page). The orientation of the gate structures 604 of the lower portion 608 are illustrative of the situation where ambient air flow velocity may be too high to ensure frequency locking between the aperture and the elongated cavity, and thus to ensure desired air flow velocity across the aperture 106 (not visible in FIG. 6), the gate structures 604 close to decrease effective collection area.

The panels 602 and gate structures 604 of FIG. 6 are illustrative of any mechanical system that blocks or partially blocks air flow into the collection aperture 506. While FIG. 6 shows multiple gate structures 604 in operational relationship to the collection aperture 506, any mechanical system that effectively controls the air flow velocity in the reduced area duct portion 510 as a function of ambient air flow velocity and collection area may be equivalently used. Moreover, the gate structures may be oriented by any suitable positioning system. In some embodiments the gate structures 602 may be adjusted by an electromechanical system that measures air flow velocity, and adjusts the gate structures 604 using a positioning system (e.g., stepper motor configured to cause rotational movement about the hinge 606). In yet still other embodiments, a mechanical system adjusts the gate structures 604.

While the embodiments discussed with respect to FIG. 6 may control air flow velocity across the aperture 106 based on the effective collection area of the collection aperture 506, it is noted that the gate structure 400 associated with the aperture 106, where the gate structure controls the length $L_a$ across the aperture 106, may also be used in conjunction with systems that control effective collection area. Thus, the gate structure 400 and the gate structures 602 are not necessarily mutually exclusive.

Returning briefly to FIG. 1, as mentioned above the vortex tube 100 comprises resonant structure 108, illustratively shown at the end of the elongated cavity opposite the aperture 106. The specification now turns to illustrative examples of such a resonant structure. In particular, in accordance with at least some embodiments the resonant structure 108 is a system designed and constructed to resonate at a selected resonant frequency of the elongated cavity. More particularly still, pressure or acoustic waves are created in the elongated cavity by the air flow across the aperture 106, where the acoustic waves have a frequency substantially the same as a selected resonant frequency of the elongated cavity. The acoustic waves within the elongated cavity excite the resonant structure, causing oscillatory motion of the resonant structure 108. The oscillatory motion, in turn, increases the magnitude of the pressure oscillations by positive feedback amplification which therefore increases the amount of vortex energy converted from the total air flow at the aperture. Moreover, energy may be extracted from the resonant structure 108, and the extraction may be in a variety of forms. For example, in some embodiments energy is extracted from the oscillatory motion in the form of reciprocating mechanical motion. In other embodiments, energy is extracted from the oscillatory motion by generating electrical energy from the oscillatory motion.

Figure 7:
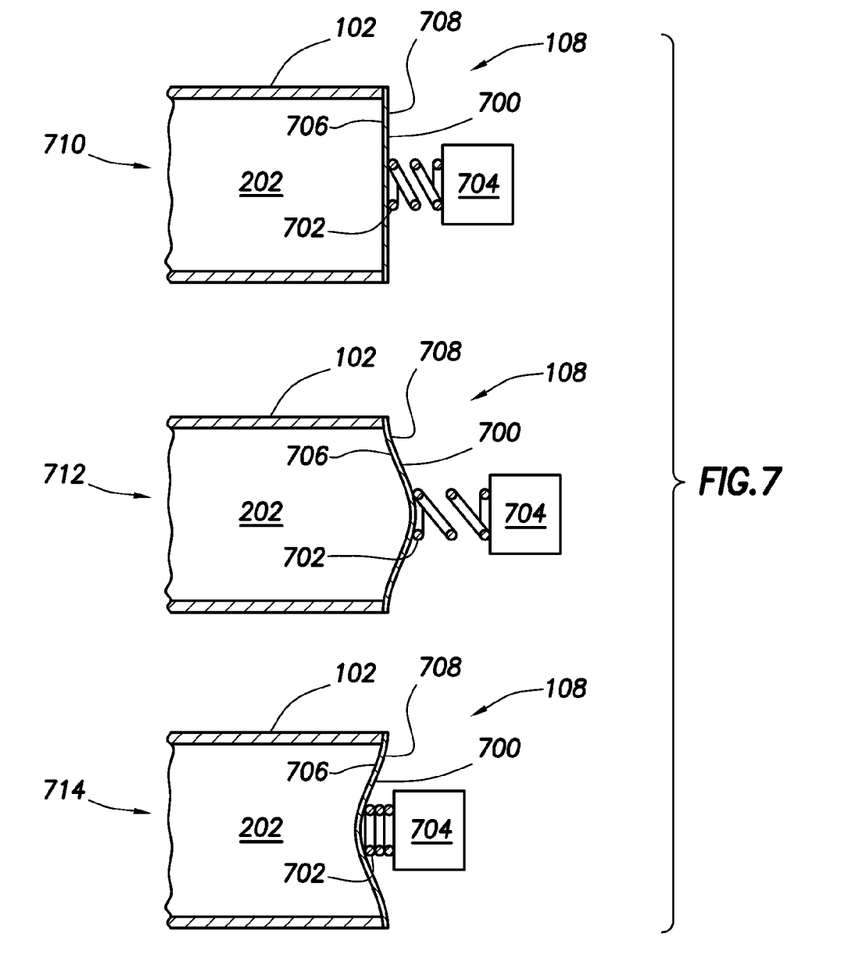
FIG. 7 shows cross-sectional side elevation views of a resonant structure in accordance with at least some embodiments.

FIG. 7 shows a plurality of cross-sectional side elevation views of an end of the tube 102 with an illustrative resonant structure 108, with the difference between the views being only the particular state of the resonant structure 108. In particular, the resonant structure 108 in the embodiments illustrated is coupled to an end of the elongated cavity 202 opposite the aperture 106 (not visible in FIG. 7). The illustrative resonant structure 108 comprises a flexible diaphragm 700. In the particular embodiment of FIG. 7, the flexible diaphragm 700 fully occludes the end of the elongated cavity 202, but any system where acoustic waves within the elongated cavity can interact with the flexible diaphragm 700 is contemplated. In some cases the flexible diaphragm 700 is a metallic structure with concentric grooves or ridges that enable distortion of the flexible diaphragm. In yet still other embodiments, the flexible diaphragm 700 is a polymer material having an inherent elasticity. In further embodiments still, the flexible diaphragm 700 may be a thin metal membrane having sufficient inherent elasticity.

The flexible diaphragm 700 couples to a spring 702 (illustrative shown as a coil spring) and a mass 704. The spring 702 and mass 704 form a mechanical harmonic oscillator, where the frequency of oscillation may be given approximately by the following equation:

$$f_{SM} = \frac{1}{2\pi}\sqrt{\frac{K}{M}} \quad (4)$$

where $f_{sm}$ is the oscillation frequency of the spring and mass system, K is the spring constant for spring 702, and M is the mass of mass 704. Thus, in the illustrative case of the resonant structure 108 being a spring and mass system, the spring constant K and mass M are selected such that the resonant frequency of the resonant structure 108 is substantially the same as the vortex shedding frequency of the aperture 106, and substantially the same as the selected resonant frequency of the elongated cavity 202.

Pressure or acoustic waves within the elongated cavity 202 create a time-varying pressure differential between an interior surface 706 of the flexible diaphragm 700 and the exterior surface 708 of the flexible diaphragm 700. The differential pressure thus acts to distort the diaphragm 700. In particular, the during periods of time when the pressure on the interior surface 706 is higher than on the exterior surface 708, the flexible diaphragm 700 tends to bulge outward and away from the elongated cavity 202, the outward bulge shown by middle portion 712 of FIG. 7. Likewise, during periods of time when the pressure on the interior surface 706 is lower than on the exterior surface 708, the flexible diaphragm 700 tends to bulge inward and toward the elongated cavity 202, the inward bulge shown by lower portion 714. Upper portion 710 represents either a rest state of the system, or an intermediate condition between the outward and inward bulges. Inasmuch as the frequency of acoustic waves within the elongated cavity 202 and the selected resonant frequency of the resonant structure are designed and constructed to be substantially the same, the motion of the flexible diaphragm results in oscillatory motion of the spring 702 and mass 704 system. Stated otherwise, the resonant structure 108 is excited by the acoustic waves within the elongated volume. In accordance with the various embodiments, energy is extracted from the resonant structure 108 based on the oscillatory motion.

Figure 8:
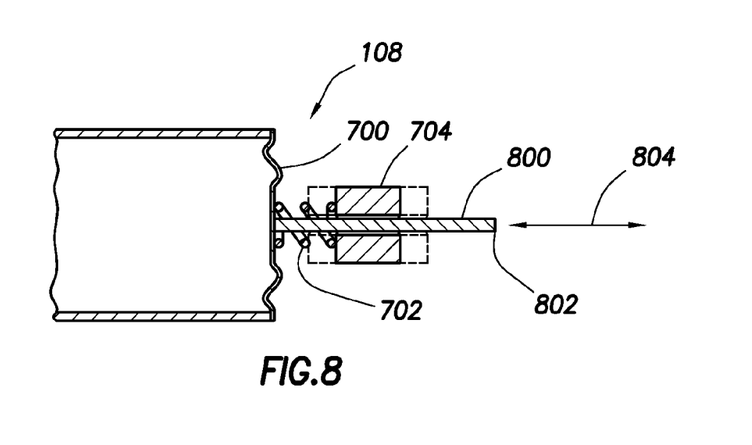
FIG. 8 shows a cross-sectional side elevation view of a resonant structure in accordance with at least some embodiments.

FIG. 8 shows a cross-sectional elevation view of an illustrative system for extracting mechanical energy. In particular, a connecting rod 800 couples to the flexible diaphragm 700 (which in FIG. 8 is illustrated as having the concentric grooves or ridges). As illustrated, the connecting rod 800 extends through the center of the spring 702 and mass 704, but other connecting mechanisms may be equivalently used (e.g., the connecting rod may couple directly to the mass rather than directly to the diaphragm, or a different portion of the diaphragm). As the resonant structure 108 oscillates, reciprocating mechanical energy may be extracted from the end 802 of the rod 800, as shown by arrow 804. The reciprocating mechanical energy may be used, for example, to operate a piston of a compressor, or the reciprocating mechanical energy may be translated into rotational movement to turn a shaft (e.g., rotor of a generator).

Figure 9:
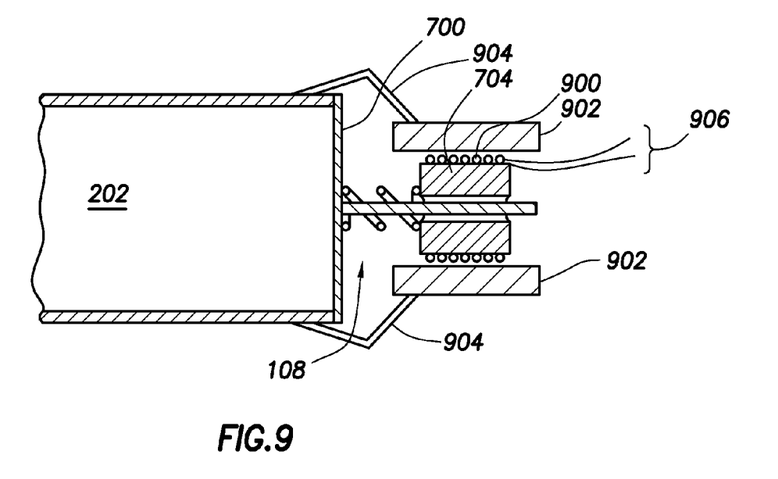
FIG. 9 shows a cross-sectional side elevation view of a resonant structure in accordance with at least some embodiments.

FIG. 9 shows a cross-sectional elevation view of an illustrative system for extracting electrical energy. In particular, in the system of FIG. 9 windings 900 are wound around the mass 704. The mass 704 with is windings are in operational relationship to a permanent magnet 902. The magnet 902 is illustratively held in place by a structure 904, but other structures for holding the magnet 902 in place may be equivalently used. As the mass 704 and windings 900 oscillate in response to acoustic waves in the elongated cavity 202, the windings 900 move through the magnetic field lines of the magnet 904, thus creating electrical energy on leads 906. In the illustrative system, the voltage generated on the leads 906 will be time varying, and have a frequency being substantially the same as the resonant frequency of the resonant structure 108. While FIG. 9 shows the magnetic 902 rigidly fixed and the windings 900 moved by the resonant structure 108, in other embodiments the magnet may be associated with the mass 704, along with a rigidly fixed windings. In yet still other embodiments, the magnet creating the magnetic field (whether stationary or moving) may be an electromagnet rather than permanent magnet.

As discussed above, the vortex shedding frequency associated with the aperture 106 and the selected resonant frequency of the elongated cavity 202 are designed and constructed to be substantially the same, and moreover there is the surprising result of frequency locking as between the aperture and elongated cavity. The result of the frequency locking is that the vortex shedding frequency remains relatively constant because of the relationship with the elongated cavity, even at air flow velocities where the vortex shedding frequency would otherwise be expected to change. The inventor of the present specification has also found yet another surprising result, related to the frequency locking between the aperture and elongated cavity, in the form broadened frequency locking in situations where a flexible diaphragm is used. In particular, the frequency locking between the vortex shedding frequency and the selected resonant frequency of the elongated cavity takes place in situations where the distal end of the elongated cavity is sealed with a rigid structure. However, the inventor of the present specification has found that closing the distal end of the elongated cavity with a flexible diaphragm 700 appears to extend the reach of the frequency locking. Stated another way, having flexible diaphragm for a closed-end elongated cavity tends to increase the range of Strouhal numbers over which frequency locking between the vortex shedding frequency of the aperture and the selected resonant frequency of the elongated cavity occurs.

Figure 10:
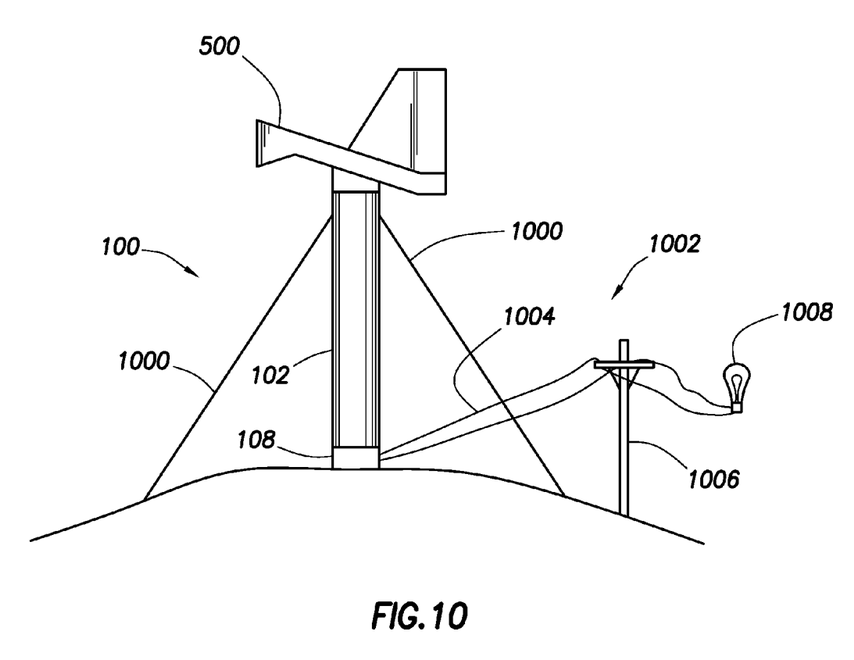
FIG. 10 shows a side view of a vortex tube in accordance with at least some embodiments.

FIG. 10 shows a side view of vortex tube 100 in operation in accordance with at least some embodiments. In particular, FIG. 10 shows the vortex tube 100, comprising duct system 500, tube 102 and resonant structure 108. In the particular embodiment shown, the vortex tube 102 is positioned in an area of naturally occurring air flow, such that the duct system 500 collects the air flow and directs the air flow across the aperture. The vortex tube 100 of FIG. 10 is oriented vertically, and held in place by guy wires 1000. As the ambient air flow encounters the duct system 500, the air flow is directed across the aperture (not visible in FIG. 10). The air flow in relation to the aperture creates acoustic waves within elongated cavity defined by the tube 102. The acoustic waves excite the resonant structure 108, and from the oscillatory energy of the resonant structure 108 electrical energy is created. In the particular embodiment illustrated, the resonant structure 108 is configured to generate electrical energy, and the electrical energy is coupled to distant users by way of a distribution system 1002, as illustrated by wires 1004, electrical pole 1006 and lamp 1008. In some cases, the frequency, phase and/or voltage of electrical energy created by the resonant structure 108 may not match that of the electrical distribution system to which the vortex tube 100 attached. In such cases, the electrical energy may be transformed by various systems, such as systems that convert alternating current (AC) electrical energy to direct current (DC) energy, and then converting back to AC at the proper frequency and phase. In yet still further embodiments, the reciprocating motion created by the resonant structure 108 may be used to store energy for later use, such as by pumping water into a reservoir at a higher elevation, compressing a gas, charging batteries, and the like.

The various embodiments discussed to this point have been based on many underlying and unstated assumptions, and many alternatives are possible. The assumptions were made, and alternatives not discussed, so as not to unduly complicate the description of the illustrative system. The specification now turns to discuss illustrative variations and alternatives which may be employed, but such variations and alternatives should only be read as exemplary of the type of alternatives that could be employed, not as an exhaustive list of such alternatives.

The illustrative system of FIG. 1 assumes a closed-end elongated cavity and the selected resonant mode being the lowest order mode (i.e., n=1 in equation (1) above). However, the various embodiments are not limited to lowest order mode of resonance. Any suitable resonance mode for a closed end elongated cavity (i.e., n=3, 5, 7, ... from equation (1) above) may be equivalently used.

Relatedly, the various embodiments have assumed a closed end elongated cavity 202. However, elongated cavities have resonance modes both in closed end and open end configurations. A vortex tube 100 in the form of a cylindrical tube with an open end has approximate resonant frequencies as given by the equation:

$$f_c = \frac{nv}{2(L_t + 0.8D)} \quad (5)$$

where $f_c$ is the open end resonant frequency, v is the velocity of sound of the fluid in the tube, n is a positive integer (e.g., 1, 2, 3 ... ), $L_t$ is the length of the tube, and D is the internal diameter. In situations where an open end tube is used, the resonant structure 108 is placed at a location on the tube where the standing waves within the tube have the greatest pressure swing. For example, for resonance at n=1, the resonant structure may be placed at the middle of the elongated cavity. For resonance at n=2, the resonant structure may be placed ⅓ of the length of the tube from the aperture, or ⅓ of the length of the tube from open end. In other cases for higher order resonance modes, a resonant structure 108 may be placed at each location where the standing waves have the highest pressure swing. Moreover, an open end elongated cavity has an advantage that unwanted elements that find their way into the elongated cavity (e.g., water, debris, birds) simply exit the lower end of the tube.

A resonant structure 108 in the case of an open end vortex tube 100 may take many forms. In some cases, the flexible diaphragm may couple to (and occlude) an aperture through tube 102 wall, and work as discussed with respect to FIG. 7. In yet still other cases, the flexible diaphragm may circumscribe the elongated cavity, such that during periods of high pressure at the node the flexible diaphragm bulges outward in all radial directions, and during periods of low pressure the flexible diaphragm collapses inward radially.

Further still, the various embodiments discussed to this point have assumed that the length of the elongated cavity remains constant. However, a constant length elongated cavity is not required. For example, the discussion above regarding Strouhal number indicates that in some embodiments the distance across the aperture (measured in the direction of air flow) may change to ensure the vortex shedding frequency across the aperture remains relatively constant for differing air flow velocities across the aperture. Another embodiment uses a constant distance across the aperture, but varies the length of the elongated cavity such that a selected resonant mode of the cavity matches the prominent vortex shedding frequency at the aperture. For example, the elongated cavity could be created two (or more) tubes telescopically coupled. As more length L is needed, a linear drive system telescopes a first tube out of the second tube, thus increasing the length and changing the resonant frequency of the elongated cavity defined by the tubes proportionally. Likewise, when less length is needed, the linear drive system telescopes the first tube back into the second tube, thus decreasing the length.

Figure 11:
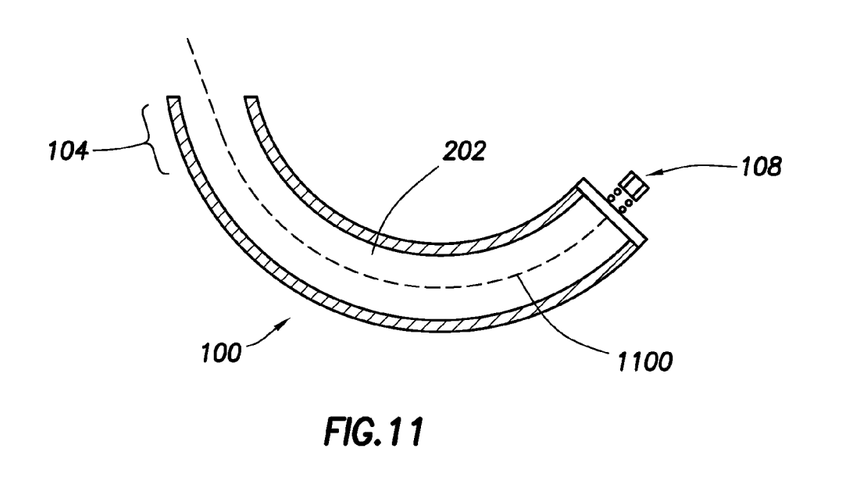
FIG. 11 shows a cross-sectional elevation view of a vortex tube in accordance with at least some embodiments.

Further still, the various embodiments discussed to this point have assumed the elongated cavity to have a circular cross-section, and that the center of the elongated cavity from end-to-end defines a straight line. However, other cross-sectional shapes may be equivalently used. For example, the elongated cavity may have any suitable cross-sectional shape (e.g., ellipse, square, rectangular, hexagonal cross-section). Moreover the center of the elongated cavity need not define a straight line. For example, FIG. 11 shows a cross-sectional elevation view of a vortex tube 100 in accordance with alternative embodiments. In particular, entrance portion 104 couples to elongated cavity 202, and a resonant structure 108 couples on the end of the elongated cavity 202 opposite the aperture 104. However, the central line 1100 of the elongated cavity 202 is curve, yet the vortex tube 100 of FIG. 11 would still be operational. While the inventor of the present specification has found sharp angles in an elongated cavity tends to adversely affect creation of the standing waves, long radius curvature (e.g., greater than two times the diameter) has little, if any, affect on creation of the standing waves in the elongated cavity.

Yet further still, in the embodiments discussed to this point the elongated cavity 202 has been defined by the walls of tube 102. However, the elongated cavity may likewise be defined by the absence of material. For example, a large diameter bore into the earth could define an elongated cavity suitable for extraction of energy from ambient air flow.

The specification now turns to description of an example vortex tube. In particular, a vortex tube was created to test the operation of systems as described above. The example vortex tube comprised a PVC tube having a 4 inch (0.1 m) internal diameter D, a 60 inch (1.5 m) length $L_t$, and closed end. The configuration of the tube resulted in a n=1 resonant frequency of approximately 56 Hertz. The aperture at the top of the tube defined an angle β as described above of 28 degrees. The example vortex tube had a resonant structure that acted to close or seal the end of the tube opposite the aperture. The resonant structure comprised a flexible diaphragm of plastic material (in particular, the plastic lid from a large coffee can), a tapered spring approximately 5 centimeters (cm) in height (and having approximately eight turns) and a mass in the form of a hardware nut. Washers or circular plates were coupled to the center of the flexible diaphragm, one plate on the inside surface and one plate on the exterior surface. The plates were biased toward each other such that the plates 'sandwiched' the flexible diaphragm. The plates each had a diameter such that only about 2 cm of flexible diaphragm was exposed outside the plates (i.e., plates were circular and had diameters of about 6 cm). The spring coupled to the exterior plate, and the hardware nut coupled to the spring.

A cardboard cylinder, having an outside diameter of about 1 cm, coupled to the nut, such that hardware nut and cardboard cylinder shared a central axis. About 200 turns of 22 gauge wire were wrapped around the distal end of the cardboard cylinder. The portion of the cardboard cylinder having the turns of wire extended into a corresponding groove within permanent magnet. The leads from the windings were coupled to a 7 ohm load. With an air flow velocity at the aperture of about 18 MPH (7.8 m/s), the vortex tube of this example generated about 0.43 Watts of power into the 7 Ohm load, resulting in about a 19% efficiency as calculated by the inventor.

Efficiency in this instance is calculated as the percentage of power in the air flow of the capture area of vortex tube converted into electrical energy delivered to the load. As for power in the air flow, one accepted equation relating air flow velocity to power is given by the equation:

$$P = 0.5 \times \rho \times A \times V^3 \quad (6)$$

where P is power in Watts, ρ is density of the air flow (for air, about 1.225 kilograms/cubic meter at standard temperature pressure), A is the area of the air flow, and V is the velocity of the air flow. The area A for the efficiency calculation for the example vortex tube is considered to be the effective area of the aperture as seen by air flow. The effective area is smaller than the actual area of the aperture, or the actual area of the cross-section of the tube, because of the angle of the wind relative to the plane of the aperture. For example, in golf the hole on a green is circular when viewed from directly above, but when viewed from a distance (e.g., the edge of the green), the hole appears elliptical and, generally, presents a smaller projected area. The same idea applies in calculating the capture area for efficiency calculation purposes. The air flow capture area for air flow encountering the aperture at around 32 degrees is smaller than the area of the aperture, or the cross-sectional area of the tube. The inventor of the present specification has calculated that the capture area for efficiency calculation purposes is about 0.48 times the cross-sectional area of the tube for tubes with circular cross-sections.

Figure 12:
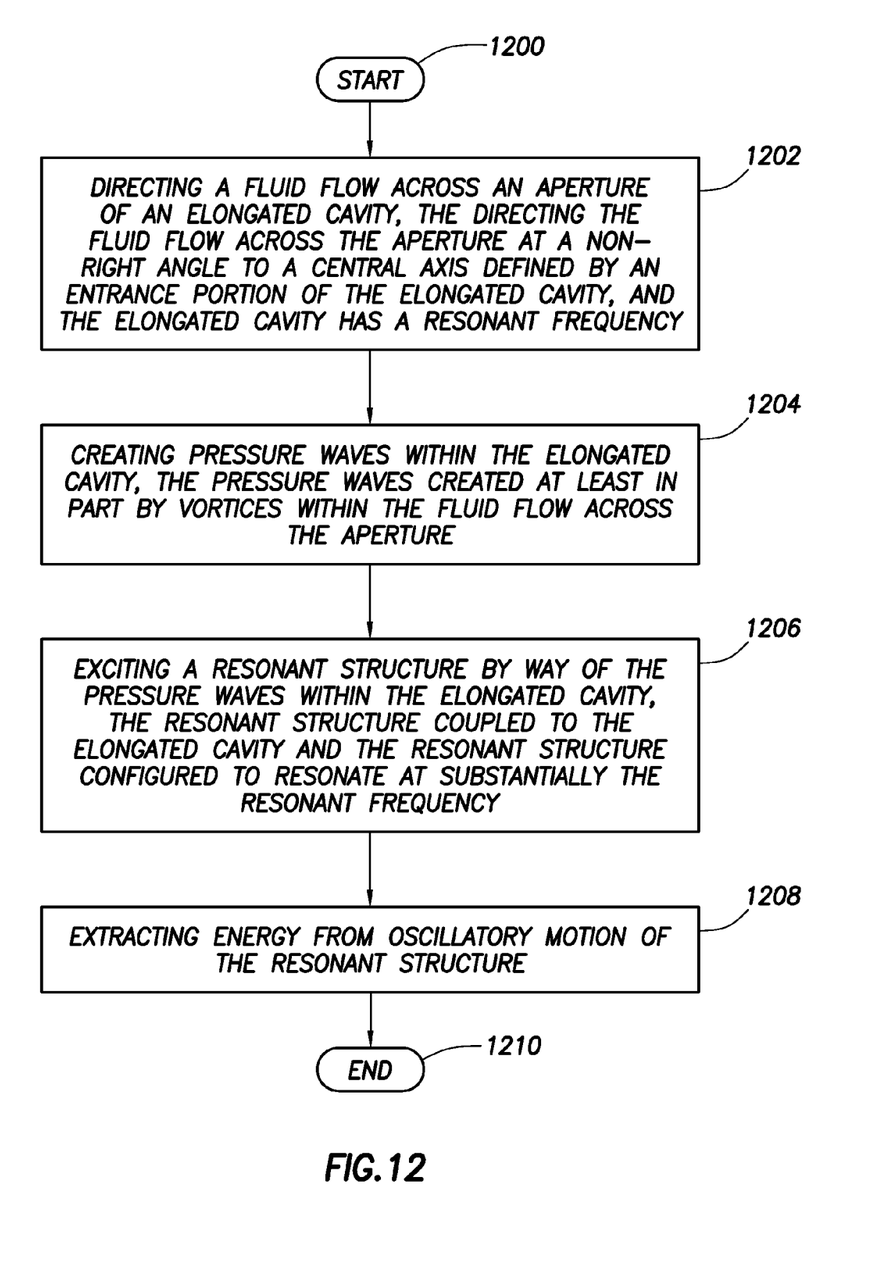
FIG. 12 shows a method in accordance with at least some embodiments.

FIG. 12 illustrates a method in accordance with at least some embodiments. In particular, the method starts (block 1200) and proceeds to directing a fluid flow across an aperture of an elongated cavity, the directing the fluid flow across the aperture at a non-right angle to a central axis defined by an entrance portion of the elongated cavity, and the elongated cavity has a resonant frequency (block 1202). Next, the illustrative method involves creating pressure waves within the elongated cavity, the pressure waves created at least in part by vortices within the fluid flow across the aperture (block 1204). Exciting a resonant structure by way of the pressure waves within the elongated cavity, the resonant structure coupled to the elongated cavity and the resonant structure configured to resonate at substantially the resonant frequency (block 1206). Finally, the illustrative method involves extracting energy from oscillatory motion of the resonant structure (block 1208), and the method ends (block 1210).

The above discussion is meant to be illustrative of the principles and various embodiments of the present invention. For example, though the various drawings show the vortex tube at a non-zero angle to the ground (e.g., FIG. 1) or perpendicular to the ground (e.g., FIG. 10), in other embodiments the vortex tube 102 may reside horizontal to the ground (with appropriate direction of air flow across the aperture). Numerous variations and modifications will become apparent to those skilled in the art once the above disclosure is fully appreciated. It is intended that the following claims be interpreted to embrace all such variations and modifications.

What is claimed is:

1. A method comprising:
    directing a fluid flow across an aperture of an elongated cavity, the directing the fluid flow across the aperture at a non-right angle to a central axis defined by an entrance portion of the elongated cavity, and the elongated cavity has a resonant frequency;
    creating pressure waves within the elongated cavity, the pressure waves created at least in part by vortices within the fluid flow across the aperture;
    exciting a resonant structure by way of the pressure waves within the elongated cavity, the resonant structure coupled to the elongated cavity and the resonant structure configured to resonate at substantially the resonant frequency; and
    extracting energy from oscillatory motion of the resonant structure.

2. The method of claim 1 wherein directing the fluid flow further comprises directing the fluid flow across the aperture where the aperture defines a first plane, and wherein an angle between the first plane and a second plane, the central axis normal to the second plane, is between 10 and 50 degrees inclusive.

3. The method of claim 1 wherein directing the fluid flow further comprises directing the fluid flow across the aperture where the aperture defines a first plane, and wherein an angle between the first plane and a second plane, the central axis normal to the second plane, is between 28 and 33 degrees inclusive.

4. The method of claim 1 wherein creating pressure waves further comprises controlling a frequency of vortex creation by adjusting a length of the aperture, the length measured along the direction of the fluid flow.

5. The method of claim 4 wherein adjusting the length of the aperture further comprises sliding a gate across the aperture, the gate partially blocks the aperture.

6. The method of claim 1 wherein creating pressure waves further comprises controlling a frequency of vortex creation by adjusting velocity of the fluid across the aperture.

7. The method of claim 6 wherein adjusting velocity of the fluid across the aperture further comprises changing an effective fluid collection area, wherein fluid collected in the fluid collection area is directed across the aperture.

8. The method of claim 1 wherein directing the fluid flow across the aperture further comprises:
collecting fluid flow with a duct having a collection aperture that defines a first area, the fluid has a first velocity at the collection aperture, and the duct has a section of reduced cross-section that facilitates an increase in fluid velocity; and
directing the fluid flow across the aperture of the elongated cavity.

9. The method of claim 1 wherein exciting the resonant structure further comprises exciting a spring and mass system by the pressure waves that cause movement of a flexible diaphragm coupled to the spring and mass system.

10. The method of claim 9 wherein extracting energy further comprises generating electrical energy from the oscillatory motion.

11. The method of claim 1 wherein directing further comprises directing the fluid flow across the aperture of the elongated cavity that defines the aperture on a first end and a closed second end opposite the first end.

12. The method of claim 1 wherein directing further comprises directing the fluid flow across the aperture of the elongated cavity that defines the aperture on a first end and an open second end opposite the second end.

13. The method of claim 1 wherein directing further comprises directing fluid flow across a tube that defines the elongated cavity.

14. The method of claim 1 wherein directing further comprises directing the fluid flow across the aperture of the elongated cavity where the elongated defines a central line, and where the central line is at least one selected from the group consisting of: straight; and curved.

15. The method of claim 1 further comprising rotating the entrance portion of the elongated cavity to align with a direction of fluid flow.

16. A system comprising:
a structure that defines an elongated cavity that has a first resonant frequency;
an entrance portion of the elongated cavity that defines an aperture, the entrance portion defines a central axis, two points on opposite sides of the aperture define a line segment, and the line segment intersects the central axis at a non-right angle; and
a resonant structure configured to mechanically oscillate at the first resonant frequency, the resonant structure fluidly coupled to the elongated cavity, and wherein pressure waves in the elongated cavity cause the resonant structure to oscillate.

17. The system of claim 16 further comprising a duct system in operational relationship to the entrance portion, the duct system configured to direct a fluid flow across the aperture, and wherein the direction of fluid flow across the aperture at a non-right angle to the central axis.

18. The system of claim 17 wherein the duct system further comprises:
a collection aperture that defines a first cross-sectional area, and wherein fluid flow across the first cross-sectional area has first velocity; and
a reduced area duct portion fluidly coupled to the collection aperture, the reduced area duct portion defines a second cross-sectional area smaller than the first cross-sectional area;
wherein the reduced area duct portion directs the fluid flow across the aperture.

19. The system of claim 18 further comprising wherein the first cross-sectional area of the collection aperture is configured to change to maintain a fluid flow velocity within the reduced area duct portion within a predetermined range.

20. The system of claim 17 further comprising:
the duct system mechanically coupled to the entrance portion of the elongated cavity; and
the entrance portion rotationally coupled to the elongated cavity;
wherein the duct system and entrance portion are configured to rotate such that the duct system collects fluid flow from a plurality of different directions.

21. The system of claim 20 further comprising wherein the duct system and entrance portion are configured to rotate through 360 degrees of rotation.

22. The system of claim 16 further comprising the entrance portion rotationally coupled to the elongated cavity such that the entrance portion is configured to rotate through 360 degrees of rotation.

23. The system of claim 16 further comprising a gate structure in operational relationship to the aperture, and wherein the gate structure is configured to change an exposed area of the aperture based on velocity of fluid that flows across the aperture.

24. The system of claim 16 wherein the resonant structure further comprises:
a flexible diaphragm having a first surface exposed to the elongated cavity;
a spring coupled to the diaphragm; and
a mass coupled to the spring;
wherein the pressure waves in the elongated cavity cause the flexible diaphragm to oscillate, and the flexible diagram causes the spring and mass to oscillate.

25. The system of claim 24 wherein electrical energy is generated based on the oscillation of the resonant structure.

26. The system of claim 16 wherein mechanical energy is extracted from the oscillation of the resonant structure.

27. The system of claim 16 wherein the angle between the line segment and the central axis is between 10 and 50 degrees inclusive.

28. The system of claim 16 wherein the angle between the line segment and the central axis is between 28 and 33 degrees inclusive.

29. The system of claim 16 wherein the elongated cavity defines a central line, and wherein the central line is curved.

30. The system of claim 16 wherein the structure that defines the elongated cavity comprises, at least in part, a tube.

31. The system of claim 16 wherein the elongated cavity defines a first cross-sectional shape, and the entrance portion defines a second cross-sectional shape, and wherein the first and second cross-sectional shapes are the same.

32. The system of claim 31 wherein dimensions of the first cross-sectional shape and the second cross-sectional shape are the same.

33. The system of claim 16 wherein the elongated cavity has a closed end opposite the aperture.

34. A method of generating electrical energy from wind comprising:
directing air flow across an aperture of an elongated cavity that has a resonant frequency, an entrance portion of the elongated cavity defines a central axis, and the acute angle between the central axis and the direction of air flow is between 10 and 50 degrees inclusive;

creating pressure waves within the elongated cavity at least in part by vortices within air flow across the aperture, and a frequency at which vortices are created substantially the same as the resonant frequency of the elongated cavity;

exciting a resonant structure by way of the pressure waves within the elongated cavity, the resonant structure configured to resonate substantially at the resonant frequency; and generating electrical energy from oscillatory motion of the resonant structure.

35. The method of claim 34 wherein directing the air flow further comprises directing the air flow where the acute angle between the central axis and the direction of air flow is between 28 and 33 degrees inclusive.

36. The method of claim 34 further comprising controlling the frequency at which vortices are created by adjusting a length of the aperture, the length measured along the direction of the air flow.

37. The method of claim 36 wherein adjusting the length of the aperture further comprises sliding a gate across the aperture, the gate partially blocks the aperture.

38. The method of claim 36 wherein controlling the frequency at which vortices are created further comprises controlling a Strouhal number to be within predetermined range.

39. The method of claim 34 further comprising controlling the frequency at which vortices are created by adjusting the velocity of the air flow across the aperture.

40. The method of claim 39 wherein adjusting the velocity further comprises changing a collection area of air flow directed across the aperture.

41. The method of claim 34 wherein exciting the resonant structure further comprises exciting a spring and mass system by movement of a flexible diaphragm caused by pressure waves within the elongated cavity.

42. The method of claim 34 wherein directing further comprises directing air flow across a tube that defines the elongated cavity.

43. The method of claim 34 wherein directing further comprises directing the air flow across the aperture of the elongated cavity where the elongated cavity defines a central line, and where the central line is curved.

44. A system to extract electrical energy from wind comprising:

a structure that defines an elongated cavity that has a first resonant frequency;

an entrance portion of the elongated cavity that defines an aperture, and air flow is directed across the aperture, the entrance portion defines a central axis and the acute angle between the central axis and the direction of air flow is between 10 and 50 degrees inclusive;

a resonant structure configured to mechanically oscillate at the first resonant frequency, the resonant structure fluidly coupled to the elongated cavity; and an electrical generator mechanically coupled to the resonant structure;

wherein pressure waves within the elongated cavity caused by the vortex shedding across the aperture cause the resonant structure to mechanically oscillate, and wherein the electrical generator creates electrical energy from the mechanical oscillation.

45. The system of claim 44 further comprising a duct system in operational relationship to the entrance portion, the duct system configured to direct air flow across the aperture.

46. The system of claim 45 wherein the duct system further comprises:

a collection aperture that defines a first cross-sectional area, and wherein air flow across the first cross-sectional area has first velocity; and a reduced area duct portion fluidly coupled to the collection aperture, the reduced area duct portion defines a second cross-sectional area smaller than the first cross-sectional area;

wherein the reduced area duct portion directs the air flow across the aperture.

47. The system of claim 45 further comprising:

the duct system mechanically coupled to the entrance portion of the elongated cavity; and the entrance portion rotationally coupled to the elongated cavity;

wherein the duct system and entrance portion are configured to rotate such that the duct system collects air flow from a plurality of different directions.

48. The system of claim 44 further comprising a gate structure in operational relationship to the aperture, and wherein the gate structure is configured to change an area of the aperture exposed based on velocity of fluid that flows across the aperture.

49. The system of claim 44 wherein the resonant structure further comprises:

a flexible diaphragm having a first surface exposed to the elongated cavity;

a spring coupled to the diaphragm; and a mass coupled to the spring;

wherein the pressure waves in the elongated cavity cause the flexible diaphragm to oscillate, and the flexible diaphragm cause the spring and mass to oscillate.

50. The system of claim 44 wherein the acute angle between the central axis and the direction of air flow across the aperture is between and including 28 and 33 degrees.

* * * * *